(12) United States Patent
Tokumaru

(10) Patent No.: US 12,229,929 B2
(45) Date of Patent: **\*Feb. 18, 2025**

(54) MULTISPECTRAL FILTERS

(71) Applicant: AeroVironment, Inc., Arlington, VA (US)

(72) Inventor: Phillip T Tokumaru, Thousand Oaks, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,813

(22) Filed: Jun. 22, 2023

(65) Prior Publication Data

US 2023/0334638 A1 Oct. 19, 2023

Related U.S. Application Data

(63) Continuation of application No. 17/490,393, filed on Sep. 30, 2021, now Pat. No. 11,721,008, which is a
(Continued)

(51) Int. Cl.
| | |
|---|---|
| *G06T 7/00* | (2017.01) |
| *G06T 3/4015* | (2024.01) |
| *G06T 7/90* | (2017.01) |
| *G06V 10/143* | (2022.01) |
| *G06V 20/10* | (2022.01) |

(Continued)

(52) U.S. Cl.
CPC .............. *G06T 7/00* (2013.01); *G06T 3/4015* (2013.01); *G06T 7/90* (2017.01); *G06V 10/143* (2022.01); *G06V 20/17* (2022.01); *G06V 20/188* (2022.01); *B64U 2101/30* (2023.01); *G06T 2207/10024* (2013.01); *G06T 2207/10036* (2013.01); *G06T 2207/30188* (2013.01)

(58) Field of Classification Search
CPC ........... G06T 7/00; G06T 3/4015; G06T 7/90; G06T 2207/10024; G06T 2207/10036; G06T 2207/30188; B64C 39/024; G06V 10/143; G06V 20/17; G06V 20/188; B64U 70/80; B64U 2101/30
USPC ......................................................... 382/110
See application file for complete search history.

(56) References Cited

U.S. PATENT DOCUMENTS

| | | |
|---|---|---|
| 7,911,517 B1 | 3/2011 | Hunt, Jr. et al. |
| 9,945,828 B1 | 4/2018 | Poling et al. |

(Continued)

*Primary Examiner* — Huy C Ho
(74) *Attorney, Agent, or Firm* — Command IP LLP; Pejman Yedidsion; Eric Aagaard

(57) ABSTRACT

A method and system including: an aerial vehicle including: a first camera comprising a first sensor having at least red, green, and blue color channels, where the blue color channel is sensitive to near-infrared (NIR) wavelengths; a first optical filter disposed in front of the first sensor, wherein the first optical filter is configured to block wavelengths below green, between red and NIR, and longer wavelength NIR; a processor having addressable memory in communication with the first camera, where the processor is configured to: capture at least one image of vegetation from the first camera; provide red, green, and NIR color channels from the captured image from the first camera; and determine at least one vegetative index based on the provided red, green, and NIR color channels.

20 Claims, 12 Drawing Sheets

Related U.S. Application Data continuation of application No. 16/259,870, filed on Jan. 28, 2019, now Pat. No. 11,157,736.

(60) Provisional application No. 62/623,502, filed on Jan. 29, 2018.

(51) Int. Cl.
*G06V 20/17* (2022.01)
*B64U 101/30* (2023.01)

(56) References Cited

U.S. PATENT DOCUMENTS

| | | |
|---|---|---|
| 2008/0029708 A1* | 2/2008 | Olsen .................. G03B 33/04 |
| | | 257/E31.127 |
| 2012/0155714 A1 | 6/2012 | Douglass et al. |
| 2016/0006954 A1 | 1/2016 | Robertson |
| 2018/0129879 A1* | 5/2018 | Achtelik .................. G01C 5/00 |
| 2018/0176488 A1 | 6/2018 | Dvir |
| 2018/0307906 A1* | 10/2018 | Nelson .................. H04N 23/16 |

* cited by examiner

| | | |
|---|---|---|
| Atmospherically Resistant Vegetation Index | $ARVI = \dfrac{\rho_{800} - [\rho_{680} - \gamma(\rho_{450} - \rho_{680})]}{\rho_{800} + [\rho_{680} - \gamma(\rho_{450} - \rho_{680})]}$ | 1000 |
| Difference Vegetation Index | $DVI = NIR - Red$ | 1002 |
| Enhanced Vegetation Index | $EVI = 2.5 * \dfrac{(NIR - Red)}{(NIR + 6 * Red - 7.5 * Blue + 1)}$ | 1004 |
| Global Environmental Monitoring Index | $GEMI = eta(1 - 0.25 * eta) - \dfrac{Red - 0.125}{1 - Red}$ $eta = \dfrac{2(NIR^2 - Red^2) + 1.5 * NIR + 0.5 * Red}{NIR + Red + 0.5}$ | 1006 |
| Green Atmospherically Resistant Index | $GARI = \dfrac{NIR - [Green - \gamma(Blue - Red)]}{NIR + [Green - \gamma(Blue - Red)]}$ | 1008 |
| Green Difference Vegetation Index | $GDVI = NIR - Green$ | 1010 |
| Green Normalized Difference Vegetation Index | $GNDVI = \dfrac{(NIR - Green)}{(NIR + Green)}$ | 1012 |
| Green Ratio Vegetation Index | $GRVI = \dfrac{NIR}{Green}$ | 1014 |
| Green Vegetation Index | $GVI = (-0.2848 * TM_1) + (-0.2435 * TM_2) + (-0.5436 * TM_3) +$ $(0.7243 * TM_4) + (0.0840 * TM_5) + (-0.1800 * TM_7)$ | 1016 |
| Infrared Percentage Vegetation Index | $IPVI = \dfrac{NIR}{NIR + Red}$ | 1018 |
| Leaf Area Index | $LAI = (3.618 * EVI - 0.118)$ | 1020 |
| Visible Atmospherically Resistant Index | $VARI = \dfrac{Green - Red}{Green + Red - Blue}$ | 1022 |
| WorldView Improved Vegetative Index | $WV\text{-}VI = \dfrac{(NIR2 - Red)}{(NIR2 + Red)}$ | 1024 |

FIG. 10A

| | | |
|---|---|---|
| Modified Non-Linear Index | $MNLI = \dfrac{(NIR^2 - Red) * (1 + L)}{NIR^2 + Red + L}$ | — 1026 |
| Modified Simple Ratio | $MSR = \dfrac{\left(\dfrac{NIR}{Red}\right) - 1}{\left(\sqrt{\dfrac{NIR}{Red}}\right) + 1}$ | — 1028 |
| Non-Linear Index | $NLI = \dfrac{NIR^2 - Red}{NIR^2 + Red}$ | — 1030 |
| Normalized Difference Vegetation Index | $NDVI = \dfrac{(NIR - Red)}{(NIR + Red)}$ | — 1032 |
| Optimized Soil Adjusted Vegetation Index | $OSAVI = \dfrac{(NIR - Red)}{(NIR + Red + 0.16)}$ | — 1034 |
| Renormalized Difference Vegetation Index | $RDVI = \dfrac{(NIR - Red)}{\sqrt{(NIR + Red)}}$ | — 1036 |
| Soil Adjusted Vegetation Index | $SAVI = \dfrac{1.5 * (NIR - Red)}{(NIR + Red + 0.5)}$ | — 1038 |
| Simple Ratio | $SR = \dfrac{NIR}{Red}$ | — 1040 |
| Sum Green Index | SGI is the mean of reflectance across the 500 nm to 600 nm portion of the spectrum. The sum is then normalized by the number of bands to convert it back to units of reflectance. | — 1042 |
| Transformed Difference Vegetation Index | $TDVI = \sqrt{0.5 + \dfrac{(NIR - Red)}{(NIR + Red)}}$ | — 1044 |

FIG. 10B

MULTISPECTRAL FILTERS

CROSS-REFERENCE TO RELATED APPLICATIONS

This application is a continuation of U.S. Non-Provisional patent application Ser. No. 17/490,393, filed Sep. 30, 2021, which is a continuation of U.S. Non-Provisional patent application Ser. No. 16/259,870, filed Jan. 28, 2019, which issued as U.S. Pat. No. 11,157,736 on Oct. 26, 2021, which claims priority to and the benefit of U.S. Provisional Patent Application No. 62/623,502, filed Jan. 29, 2018, the contents of all of which are hereby incorporated by reference herein for all purposes.

FIELD OF ENDEAVOR

The invention, in its several embodiments, pertains to visual analysis, and more particularly to vegetative index.

BACKGROUND

Filters may be used to selectively transmit light of different wavelengths. Multispectral imaging may be used to measure light in a small number of spectral bands. Hyperspectral imaging may be used to measure light in a large number of spectral bands.

SUMMARY

In some aspects of the present embodiments may include a system including: an aerial vehicle comprising: a first camera comprising a first sensor having at least red, green, and blue color channels, where the blue color channel may be sensitive to near-infrared (NIR) wavelengths; a first optical filter disposed in front of the first sensor, where the first optical filter may be configured to block wavelengths below green, between red and NIR, and longer wavelength NIR; a processor having addressable memory in communication with the first camera, where the processor may be configured to: capture at least one image of vegetation from the first camera; provide red, green, and NIR color channels from the captured image from the first camera; and determine at least one vegetative index based on the provided red, green, and NIR color channels.

In additional system embodiments, the at least one determined vegetative index may be a normalized difference vegetation index (NDVI) and/or a green normalized difference vegetation index (GNDVI). The aerial vehicle may be a vertical take-off and landing (VTOL) aerial vehicle and/or a VTOL unmanned aerial vehicle (UAV). The first optical filter may be configured to block wavelengths under about 540 nm. The first optical filter may be configured to block wavelengths between about 680 nm and 780 nm. The first optical filter may be configured to block wavelengths above around 900 nm. The first optical filter may be configured to allow wavelengths between about 540 nm and 680 nm and between about 780 nm and 850 nm. The captured at least one image may be a high-resolution image. The first sensor may include a Bayer filter on the first sensor. The captured at least one image may include wavelengths in green, red, and NIR.

Additional system embodiments may include: a second camera comprising a second sensor having at least red, green, and blue color channels; and a second optical filter disposed in front of the second sensor, where the second optical filter may be configured to block wavelengths in NIR. The processor may be further configured to: capture at least one image of vegetation from the second camera, where a field of view of the first camera may be substantially the same as a field of view of the second camera, where the first camera may be disposed proximate the second camera, and where the captured image from the first camera may be captured at substantially the same time as the captured image from the second camera; provide a blue color channel from the captured image from the second camera; and determine at least one vegetative index based on the provided red, green, blue, and NIR color channels.

In additional system embodiments, the aerial vehicle may further include: an incident light sensor in communication with the processor, where the incident light sensor may be disposed distal from the first camera and the second camera; where the processor may be further configured to: capture an incident light data from the incident light sensor; and calibrate at least one of: the captured image from the first camera and the captured image from the second camera based on the captured incident light data.

A method embodiment may include: capturing, by a first camera comprising a first sensor in communication with a processor having addressable memory, at least one image of vegetation during a horizontal flight of an aerial vehicle, where a first optical filter may be disposed in front of the first sensor, and where the first optical filter may be configured to block wavelengths below green and between red and near-infrared (NIR); and determining, by the processor, a vegetative index of the captured at least one image. In additional method embodiments, the determined vegetative index may include at least one of: a normalized difference vegetation index (NDVI) and a green normalized difference vegetation index (GNDVI).

Determining the NDVI in additional method embodiments may further include: subtracting spectral reflectance measurements in the red region of the captured at least one image from spectral reflectance measurements in the NIR region; adding spectral reflectance measurements in the red region of the captured at least one image to spectral reflectance measurements in the NIR region; and dividing the subtracted measurements from the added measurements. Additional method embodiments may include: capturing, by an incident light sensor in communication with the processor, an incident light data; and calibrating the captured at least one image of vegetation based on the captured incident light data; where the captured at least one image may be captured at substantially the same time as the captured incident light data.

Another system embodiment may include: a first camera comprising a first sensor having at least red, green, and blue color channels, where the blue color channel may be sensitive to near-infrared (NIR) wavelengths; a first optical filter disposed in front of the first sensor, where the first optical filter may be configured to block wavelengths below green, between red and NIR, and longer wavelength NIR; a second camera comprising a second sensor having at least red, green, and blue color channels, where the first camera may be disposed proximate the second camera, and where a field of view of the first camera may be substantially the same as a field of view of the second camera; and a second optical filter disposed in front of the second sensor, where the second optical filter may be configured to block wavelengths in NIR; an incident light sensor, where the incident light sensor may be disposed distal from the first camera and the second camera; a processor having addressable memory in communication with the first camera the second camera, and the incident light sensor, where the processor may be configured to: capture at least one image of vegetation from the first camera; provide red, green, and NIR color channels from the captured image from the first camera; capture at least one image of vegetation from the second camera, where the captured image from the first camera may be captured at substantially the same time as the captured image from the second camera; provide a blue color channel from the captured image from the second camera; capture an incident light data from the incident light sensor; calibrate at least one of: the captured image from the first camera and the captured image from the second camera based on the captured incident light data; and determine at least one vegetative index based on the provided red, green, blue, and NIR color channels.

BRIEF DESCRIPTION OF DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIGS. 10A-10B show examples of formulas for determining indexes and ratios based on captured data disclosed herein.

DETAILED DESCRIPTION

The disclosed system and method allow for capturing an image, e.g., of vegetation, during a flight of an aerial vehicle and determining a normalized difference vegetation index (NDVI) and/or Green Normalized Difference Vegetation Index (GNDVI) of the captured image. An aerial vehicle, such as an autonomous vertical take-off and landing (VTOL) unmanned aerial vehicle (UAV), may capture and store a plurality of images along with geographic information on the image field of a camera with a lens and an optical filter may be used to capture the plurality of images. The optical filter may block wavelengths below green and between red and near-infrared (NIR) and longer NIR to determine the NDVI and/or GNDVI by using green, red, and NIR light. This optical filter may be used with a Bayer filter on a sensor of a camera to determine NDVI and GNDVI with, for example, about 95% accuracy and without the need for narrowband filters, multiple cameras, or specialized equipment. By using this optical filter, the aerial vehicle is able to capture a large number of high-resolution images for NDVI determination while moving at a high rate of speed. Additionally, a red, green, and blue (RGB) image may be captured simultaneously with a red and green near-infrared (RGNIR) image in some embodiments.

Figure 1:
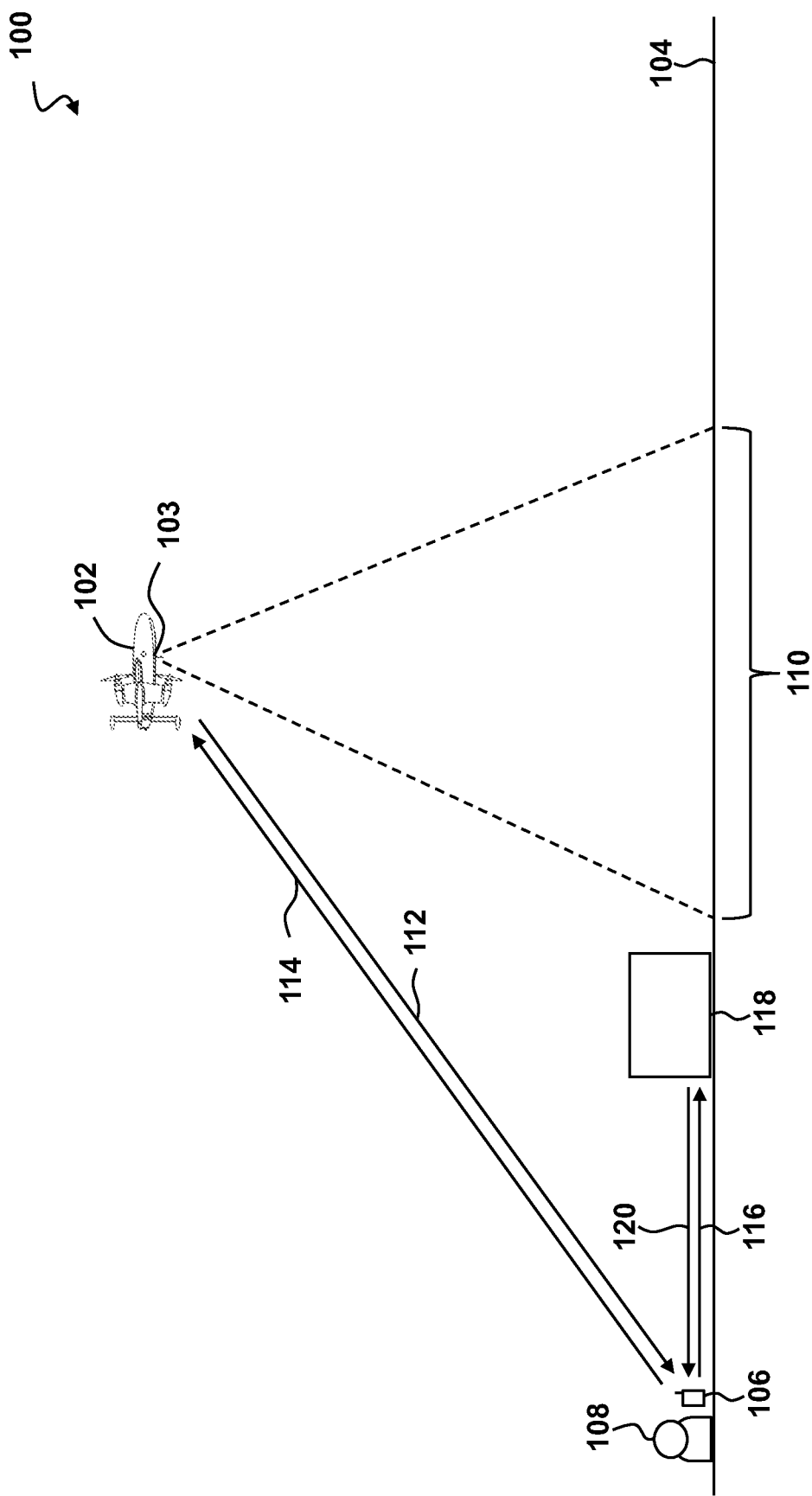
FIG. 1 depicts a system for determining a normalized difference vegetation index (NDVI) and/or Green Normalized Difference Vegetation Index (GNDVI) image from a plurality of images of a geographic area.

FIG. 1 depicts a system 100 for determining a normalized difference vegetation index (NDVI) and/or Green Normalized Difference Vegetation Index (GNDVI) image from a plurality of images of a geographic area. An aerial vehicle 102, such as an autonomous vertical take-off and landing (VTOL) unmanned aerial vehicle (UAV) may receive a flight path covering a defined geographic area of the ground 104 from a controller 106, relative to a local plane. In one embodiment, a user 108 may monitor the aerial vehicle 102 via a display of the controller 106. The aerial vehicle 102 may follow a flight path from vertical take-off to horizontal flight. The aerial vehicle 102 may use horizontal flight to maximize flight time and the area that may be imaged by a camera 103 on the aerial vehicle 102. The user 108 may use the controller 106 to monitor and control the aerial vehicle 102.

The aerial vehicle 102 may include a processor having addressable memory, a camera 103 in communication with the processor, a global positioning system (GPS) in communication with the processor, and a transceiver in communication with the processor. The camera 103 may have a field of view 110 of the ground. The camera 103 may include a lens and an optical filter disposed in front of the camera sensor, between the sensor and the lens. The optical filter may block wavelengths below green and between red and near-infrared (NIR) and above longer NIR. A sensor of the camera 103 may receive green, red, and NIR wavelengths. The processor may determine the NDVI and/or GNDVI of the captured images by using the green, red, and NIR wavelengths. The optical filter may remove the blue wavelengths and ensure separation between the red wavelengths and the infrared wavelengths. NDVI may be calculated for each pixel, or groupings of pixels, of the captured image or a combined captured image, where the combined captured image may be determined based on a process of combining multiple images with overlapping fields of view to create a combined image. In some embodiments, NDVI is determined by subtracting spectral reflectance measurements in the red region of the image from spectral reflectance measurements in the NIR region, and dividing this measurement by an addition of spectral reflectance measurements in the red region of the captured image to spectral reflectance measurements in the NIR region.

The camera 103 may be used to capture a plurality of images within the defined geographic area on the ground 104. These captured images may be stored by the processor of the aerial vehicle 102 along with geographic information, e.g., via the GPS, relating to the field of view and the center point of each image. The processor of the aerial vehicle 102 may stitch the stored images together to form a combined image showing NDVI GNDVI that may be viewed by a user 108 via a display of the controller 106.

The aerial vehicle 102 may transmit the combined image, the stored image, or other sensor or flight data, to the controller 106. The controller 106 may transmit 114 a defined geographic area, flight data, etc. to the aerial vehicle 102. The controller 106 may transmit 116 the received combined image, the stored image with NDVI, or other sensor or flight data, to a computing device 118. The computing device 118 may be a computer, laptop, tablet, cloud computing device, etc. The computing device 118 may perform additional analysis on the combined image or stored images. The computing device 118 may analyze the combined image by comparing the combined image to a historical combined image. In embodiments where the aerial vehicle 102 is used for agriculture, the computing device 118 may analyze the combined image and/or the stored images to determine crop stress, water issues, estimated crop yield, etc. The computing device 118 may also perform additional processing to smooth the combined image to account for brightness, color, dead pixels, lens distortion, etc.

The computing device 118 may transmit 120 this processed data and/or analysis to the controller 106 for review by the user 108. In some embodiments, the aerial vehicle 102 may transmit 122 the combined image, stored image, or other data to the controller 106, stored in a removable memory, e.g., a USB drive, etc.

Figure 2:
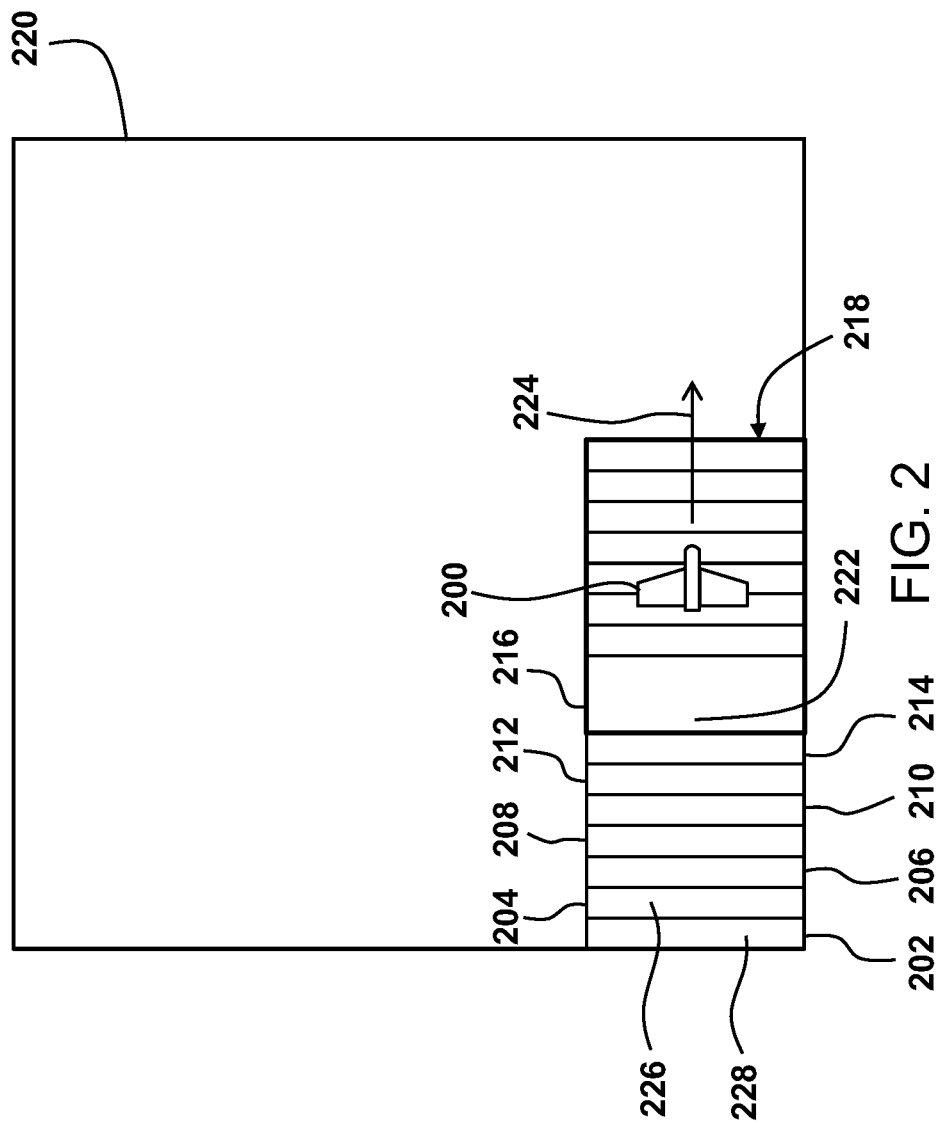
FIG. 2 depicts a UAV capturing a plurality of images of a portion of a geographic area.

FIG. 2 depicts a UAV 200 capturing a plurality of images (202, 204, 206, 208, 210, 212, 214, 216) of a portion 218 of a geographic area 220. As the UAV 200 flies over the geographic area 220, the UAV captures the plurality of images (202, 204, 206, 208, 210, 212, 214, 216), where each image contains at least a portion within the geographic area 220 and where at least two of the images overlap. Point 222 is depicted as captured on eight separate images (202, 204, 206, 208, 210, 212, 214, 216). As the UAV 200 flies forward 224 over the geographic area 220, it will continue to capture additional images, which may be used to create a combined image with NDVI that may be viewed by a user. To create this combined image, decisions have to be made as to which images to use for which parts of the combined image. Point 222 is present in eight separate images (202, 204, 206, 208, 210, 212, 214, 216), whereas point 226 is present in two images (202, 204), and point 228 is only present in one image 202. By combining the images, the stitched image is less likely to have distortion and will be more accurate for determining NDVI.

The UAV 200 may be capturing the images during horizontal flight and at a high rate of speed. Unlike hovering UAV's, such as quadrotor aerial vehicles without a fixed wing, a VTOL UAV may travel at a high rate of speed and cover a greater distance in a shorter amount of time. The VTOL UAV may be able to image 600 acres an hour, creating a stitched high-resolution image with NDVI. By contrast, a hovering-type UAV may only be able to cover a significantly smaller area. Due to limitations on height due to laws, UAVs may only be able to ascend to a maximum height of about 400 feet. As a result, hovering UAVs are limited in their ability to image a large geographic area due to speed and battery constraints.

VTOL UAVs may also be limited in their ability to create a high-resolution image of a large geographic area in a set amount of time. Due to the high rate of travel, the shutter time for each image must be short so as to prevent motion blur on the captured image. A short shutter speed corresponds to less light being captured by the sensor of the camera during each image. In certain embodiments, one option to accommodate limited light may be to use larger pixels that may have higher low light performance. Larger pixels may increase cost and/or decrease the resolution of each image. The UAV 200, via multispectral filters, may be able to take high-resolution images to determine NDVI at a fast rate with a single standard camera due to the filter blocking wavelengths in the blue range and between the red and near-infrared (NIR) range.

Figure 3:
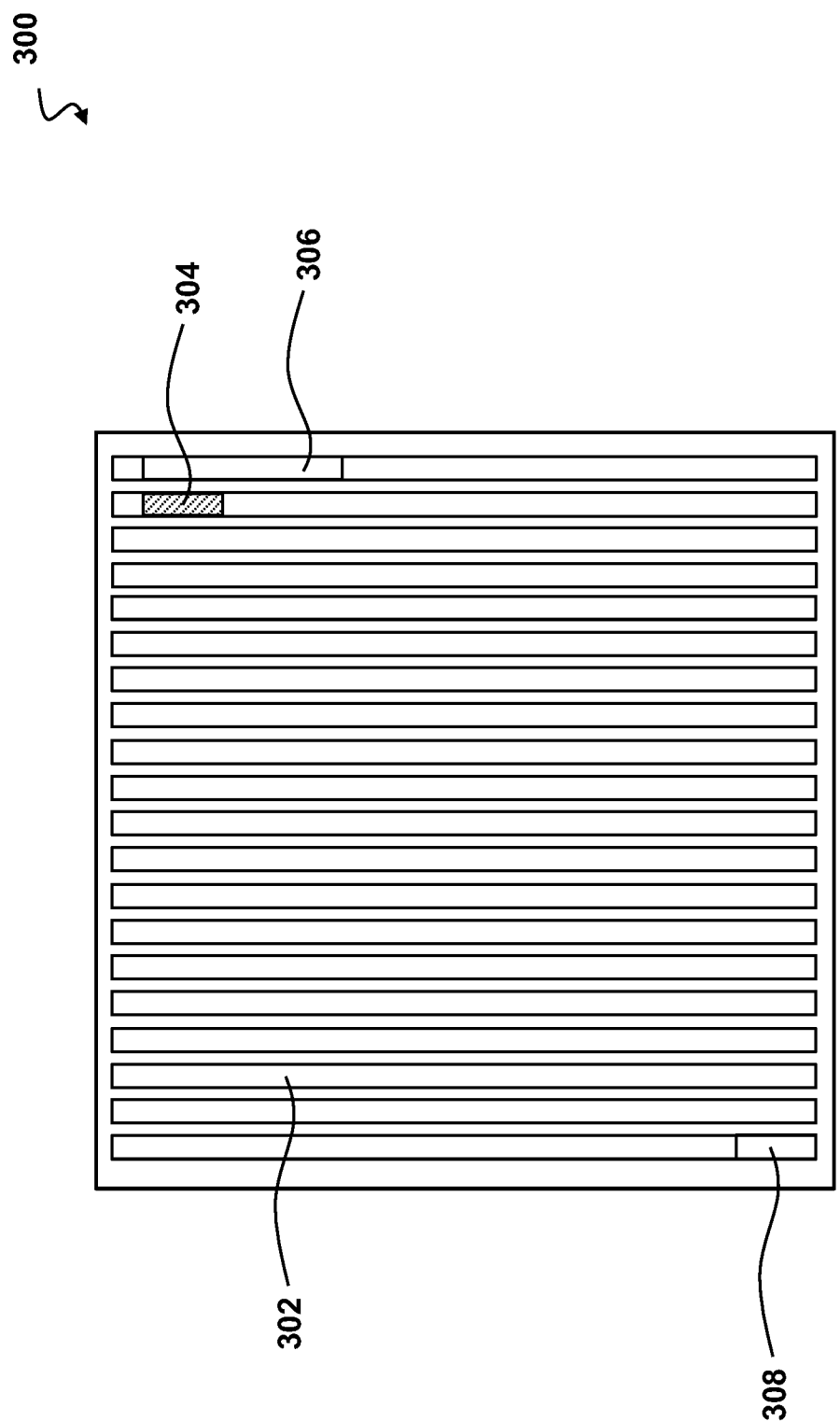
FIG. 3 depicts a combined image showing the NDVI created based on the plurality of images captured in FIG. 2.

FIG. 3 depicts a combined image 300 showing the NDVI created based on the plurality of images captured in FIG. 2. The example of the image in this figure shows a combined image 300 that may be of a field in agricultural use. Healthy vegetation 302, e.g., green crops, produces energy through photosynthesis, which absorbs visible light and reflects NIR light. By contrast, unhealthy or stressed vegetation (304, 306, 308) absorbs less visible light and more NIR light.

In order to determine NDVI, the image needs to separate spectral reflectance measurements in the red region of the captured image from spectral reflectance measurements in the NIR region. In a Bayer filter on a sensor of a camera, both red and NIR light may pass through making it difficult to separate the two measurements and accurately calculate NDVI. By adding in a filter that blocks wavelengths between red and NIR, the measurements of red and NIR can be separated and NDVI may be calculated with an accuracy of about 97.5%.

A user may be able to quickly view the combined image 300 showing the NDVI and identify any trouble spots (304, 306, 308), such as crop stress, water issues, etc. via the combined image. The user may then take corrective steps, such as adding fertilizer to the stressed crops, increasing water to those crops, etc. By identifying crop issues, the user may make targeted responses rather than broad responses, e.g., watering a specific area or adjusting irrigation to reach an edge of a field rather than increasing water to all crops in a field.

Figure 4:
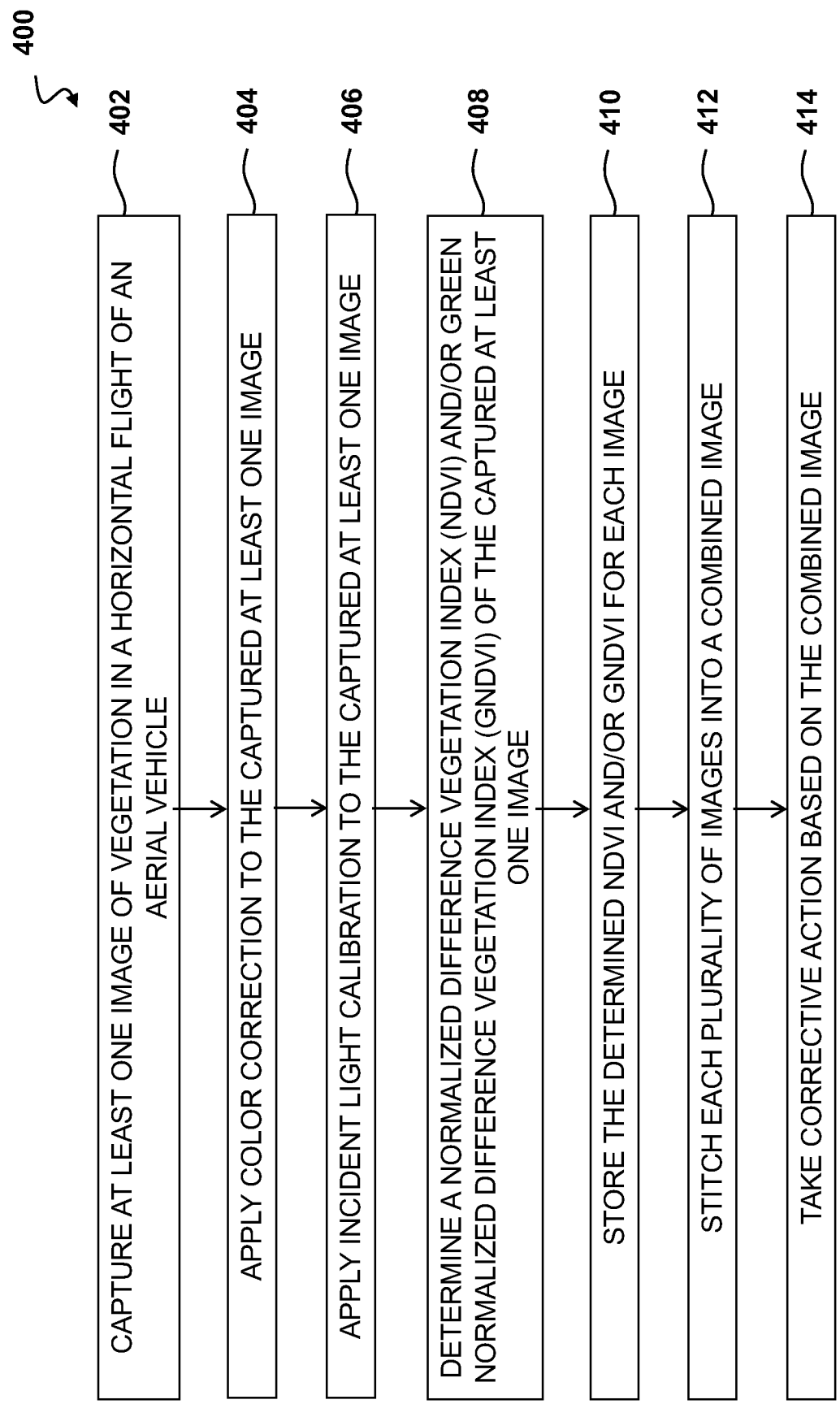
FIG. 4 depicts a flowchart of a method for generating a combined image showing the NDVI and/or GNDVI from a plurality of images of a geographic area.

FIG. 4 depicts a flowchart of a method 400 for generating a combined image showing the NDVI and/or GNDVI, or any other vegetative indices, from a plurality of images of a geographic area. At least one image of vegetation may be captured in a horizontal and/or vertical flight of an aerial vehicle (step 402). The camera may include a lens and a sensor with an optical filter disposed in front of the camera sensor, between the camera sensor and a lens of the camera. The optical filter may block wavelengths below green and between red and near-infrared (NIR). In some embodiments, the optical filter may be a dual bandpass filter allowing red, green, and NIR wavelengths. The dual bandpass filter may block wavelengths under green and between red and NIR. In some embodiments, two or more cameras may be used such that each camera has a different filter to capture different wavelengths. In one embodiment, a first camera may filter out blue wavelengths for agricultural analysis, determining NDVI, determining GNDVI, and the like. A second camera may filter our NIR to provide a visual image of an agricultural field or the like. The second camera may also supply a blue channel to be combined with the green, red, and/or NIR channels of the first camera for determining vegetative indices.

The method 400 may also include applying color correction to the captured at least one image (step 404). Color correction may be used to remove any cross-talk between the color channels. Color correction may also be used to adjust gain differences between the color channels. For example, a green sensor may be sensitive in NIR wavelengths and color correction may be used to subtract out any light that would otherwise be measured twice. A matrix multiplier may be used to correct for colors having sensitivity in other bands. In some embodiments, the color correction may be bypassed.

The method 400 may also include applying incident light calibration to the captured at least one image (step 406). An incident light sensor may be present on an aerial vehicle. In one embodiment, the incident light sensor may be disposed distal from the one or more camera sensors. For example, if the one or more camera sensors are disposed on a bottom of the aerial vehicle such that the field of view of the one or more cameras faces the ground, then the incident light sensor may be disposed on a top of the aerial vehicle such that the field of view of the incident light sensor faces the sky. The incident light sensor may record incident light data corresponding to the one or more images taken by the one or more cameras. As the aerial vehicle captures images of a geographical area, such as a field of crops, the incident light may change. This change may become more pronounced at times closer to sunrise or sunset. For example, if the incident light contains more light in the red wavelength, then the light reflected by any vegetation in the field of crops will also contain more light in the red wavelength. Applying incident light calibration will account for the change in incident light as images are being captured so that the extra red light being reflected by the crops may be subtracted. Incident light calibration allows the system and method 400 may be able to continue accurately measuring the reflectivity of any plant material rather than the color of the sunlight. Accordingly, the method 400 may be completed with accurate measurements even if conditions change, such as increased clouds or change of light, during the course of imaging a geographical area. In some embodiments, incident light calibration may not be used. The incident light sensor may be calibrated based on a location, time of year, attitude, and the like. Correcting for incident light can ensure uniform exposure.

An NDVI and/or GNDVI of the captured image may be determined (step 408). In some embodiments, any number of vegetative indices may be determined, such as those shown in FIGS. 10A-10B. The NDVI and/or GNDVI may be determined by a processor having addressable memory. The processor may be in communication with the camera. NDVI and/or GNDVI may be determined by subtracting spectral reflectance measurements in the red region of the image from spectral reflectance measurements in the NIR region, and dividing this measurement by an addition of spectral reflectance measurements in the red region of the captured image to spectral reflectance measurements in the NIR region. The red and NIR regions may be clearly separated by the optical filter.

The determined NDVI and/or GNDVI for each image may be stored (step 410). Each of the captured images may be stitched into a combined image (step 412). In some embodiments, the NDVI and/or GNDVI may be determined based on the combined image. Corrective action may be taken on the combined image (step 414). Additional processing may be performed by the aerial vehicle processor or an external processor to smooth the combined image to account for brightness, color, dead pixels, lens distortion, etc. In some embodiments, the combined image may be compared to one or more historical combined images to determine any changes that may indicate a need for corrective action. For example, if a portion of a field is showing signs of distress that were not present in historical combined images, then corrective action or further investigation may be undertaken in the area showing signs of distress.

Figure 5:
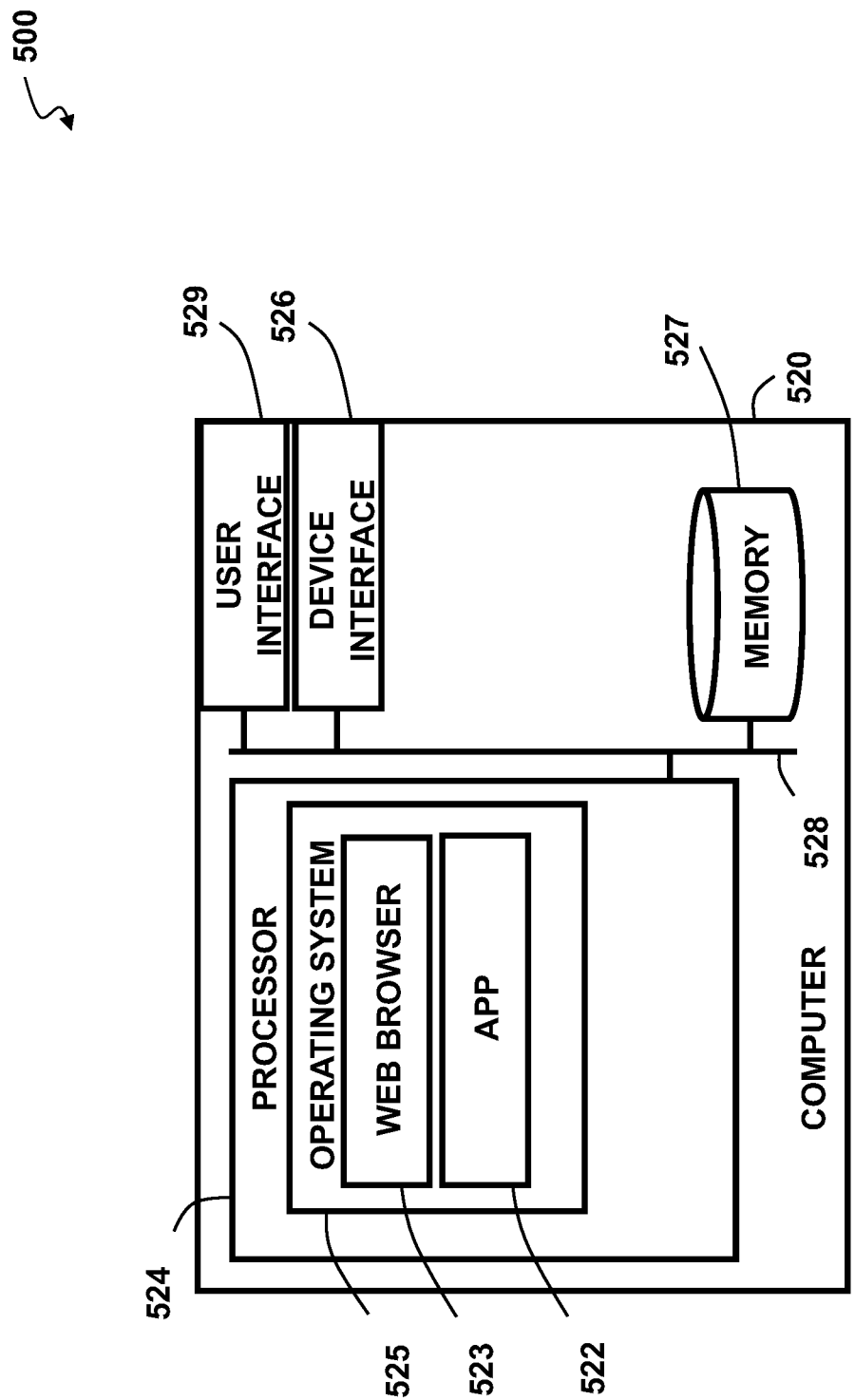
FIG. 5 illustrates a top-level functional block diagram of a computing device embodiment of an imaging system, such as UAV, controller, or computing device of FIG. 1.

FIG. 5 illustrates a top-level functional block diagram of a computing device embodiment of an imaging system, such as UAV 102, controller 106, or computing device 118 of FIG. 1. The embodiment 500 is shown as a computing device 520 having a processor 524, such as a central processing unit (CPU), addressable memory 527, an external device interface 526, e.g., an optional universal serial bus port and related processing, and/or an Ethernet port and related processing, and an optional user interface 529, e.g., an array of status lights and one or more toggle switches, and/or a display, and/or a keyboard and/or a pointer-mouse system and/or a touch screen. Optionally, the addressable memory 527 may for example be: flash memory, eprom, and/or a disk drive or other hard drive. These elements may be in communication with one another via a data bus 528. The processor 524 may have an operating system 525 such as one supporting a web browser 523 and/or applications 522, which may be configured to execute steps of a process according to the embodiments described herein.

Figure 6:
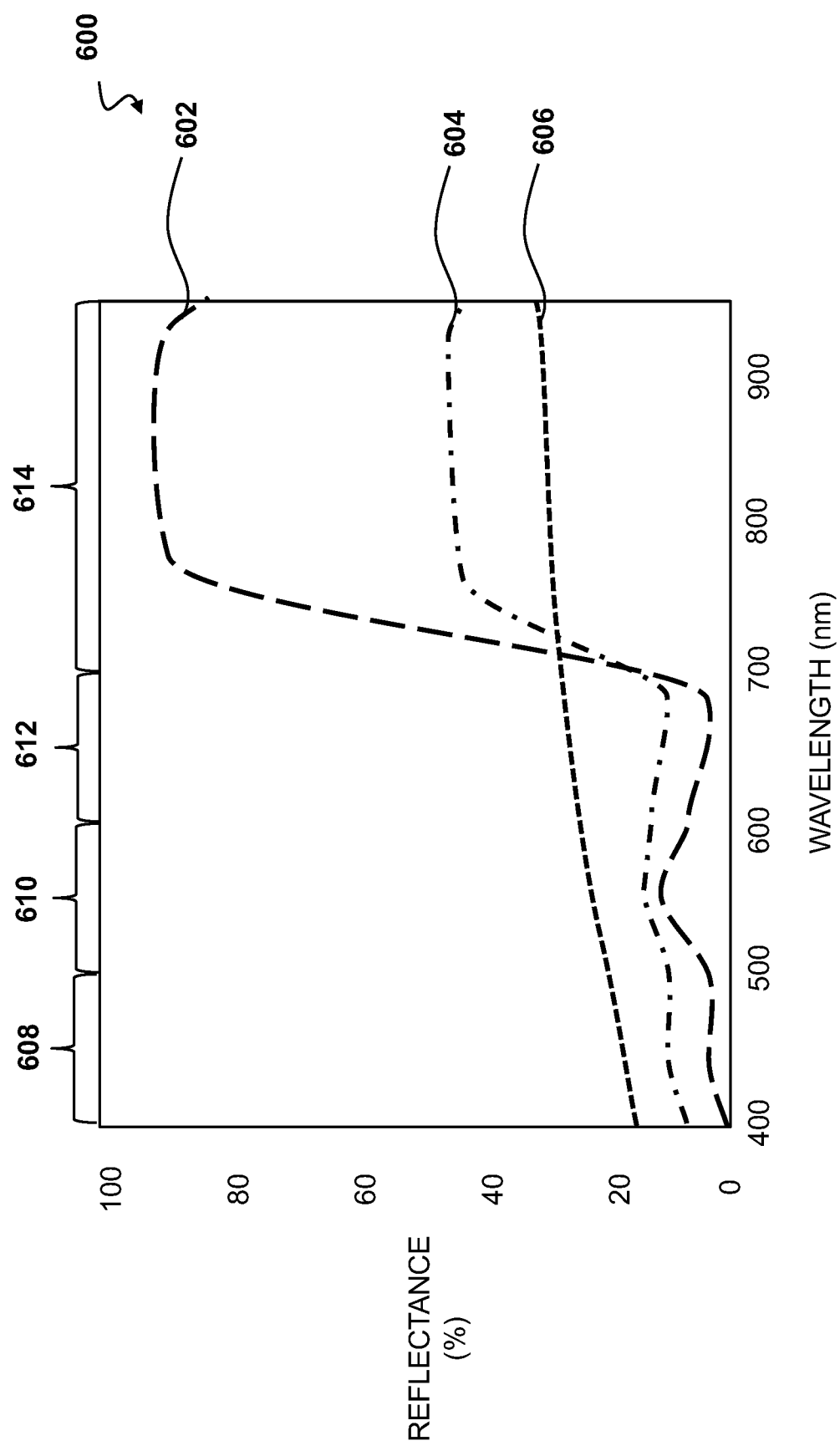
FIG. 6 depicts a chart of reflectance of healthy vegetation, stressed vegetation, and the ground over wavelengths.

FIG. 6 depicts a chart 600 of reflectance of healthy vegetation 602, stressed vegetation 604, and the ground 606 over wavelengths. The amount of reflected light varies with the wavelength of light and the object absorbing the light. In the blue color band 608, most light is absorbed and so little light is reflected. In the green color band 610, more light is reflected, but still most light is absorbed. In the red color band 612, less light is reflected than in the green band 610, but still most light is absorbed. In the near-infrared (NIR) band 614, healthy vegetation 602 reflects the most light. Healthy vegetation 602, e.g., green crops, produces energy through photosynthesis, which absorbs visible light in the blue band 608, green band 610, and red band 612 and reflects NIR light in the NIR band 614. By contrast, unhealthy or stressed vegetation 604 absorbs less visible light in the blue band 608, green band 610, and red band 612, and absorbs more NIR light in the NIR band 614. The stressed vegetation 604 reflects less NIR light in the NIR band 614 as more NIR light is being absorbed. The ground 606, such as soil, is shown for reference.

Figure 7:
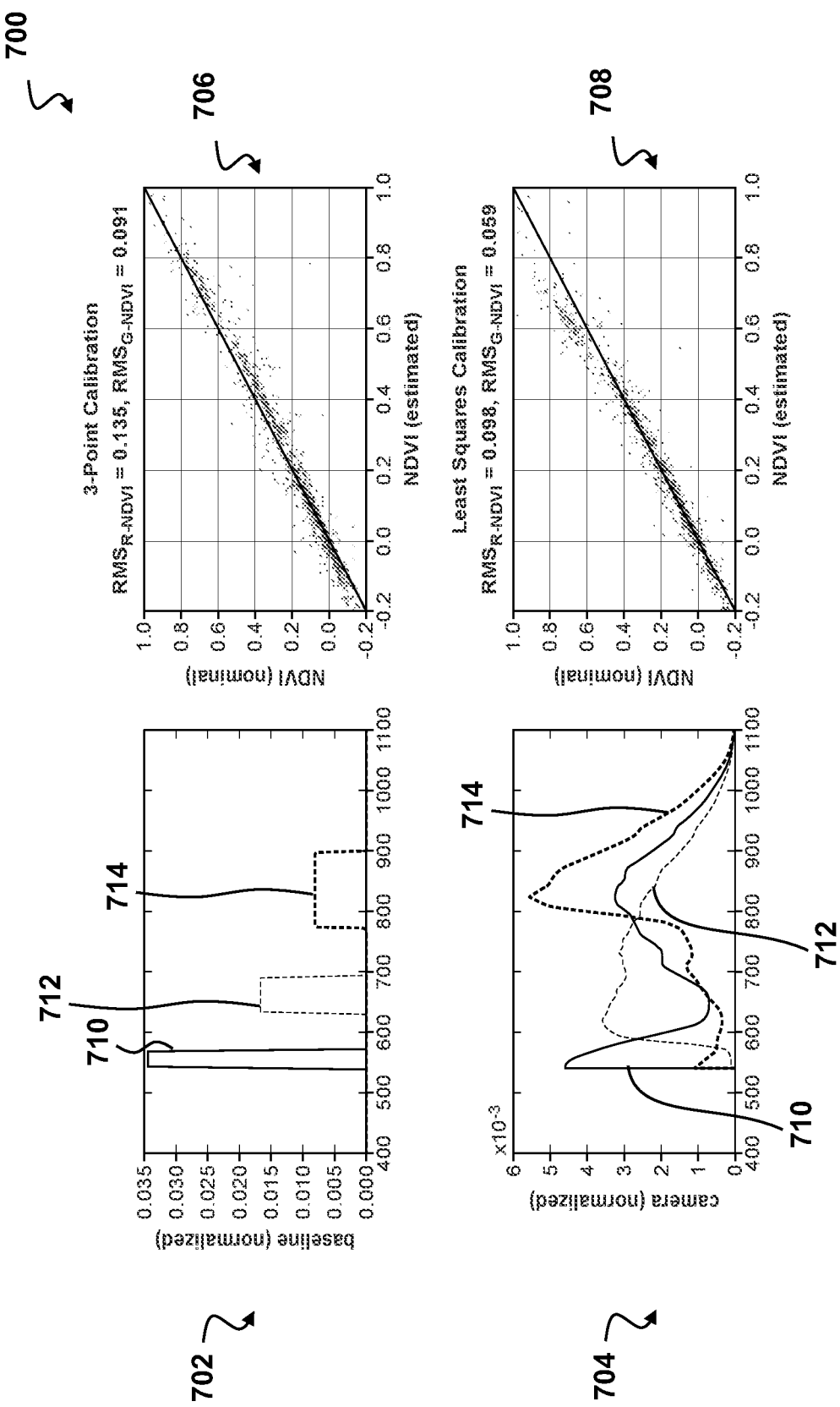
FIG. 7 depicts charts showing a performance with only a blue block filter.

FIG. 7 depicts charts 700 showing a performance using only a blue block filter over a Bayer Pattern Filter camera sensor. The charts on the right 706, 708 show the correlation of the NDVI and GNDVI reference sensor and camera and blue block filter. The upper right chart 706 is a simple calibration of the sensor, the lower right chart 708 uses a calibration using least-squares and shows slightly better correlation. The charts on the right 706, 708 have a horizontal axis for NDVI computed using a calibrated version of the blue block filter and a vertical axis for NDVI computed using the reference filter. The chart on the upper right 706 uses a simple calibration that splits the spectrum into three bands and uses three values to compute the matrix. The chart on the lower right 708 uses an actual plant spectrum and adjusts the color correction matrix such that the least squared error of the NDVI value such that error is minimized.

The upper left chart 702 shows a reference sensor with green pixel response 710, red pixel response 712, and blue pixel response 714. The lower left chart 704 shows a wavelength response of red, green, and blue channels with a blue block filter applied.

The reference bands are around 540 nm to 570 nm, 630 nm to 692 nm and 772 nm to 898 nm. Filters in the plot shown are normalized for equal areas under the curves. The NDVI blue block filter approach has an accuracy of about 87% to 90%. The GNDVI blue block filter has an accuracy of about 91% to 94%. Since the Bayer Pattern filters may have significant cross-talk, in one embodiment the sensor can be calibrated, and in another embodiment, the sensor must be calibrated. In embodiments capturing data of primarily vegetation, or plants:

$$Re = k11*Rm + k12*Gm + k13*Bm$$

$$Ge = k21*Rm + k22*Gm + k23*Bm$$

$$IRe = k31*Rm + k32*Gm + k33*Bm$$

Rm, Gm, and Bm are the values measured by the sensor and Re, Ge, IRe are the estimated values. The accompanying matrix may be shown as:

$$\begin{bmatrix} R_e \\ G_e \\ IR_e \end{bmatrix} = K \begin{bmatrix} R_m \\ G_m \\ B_m \end{bmatrix}$$

Figure 8:
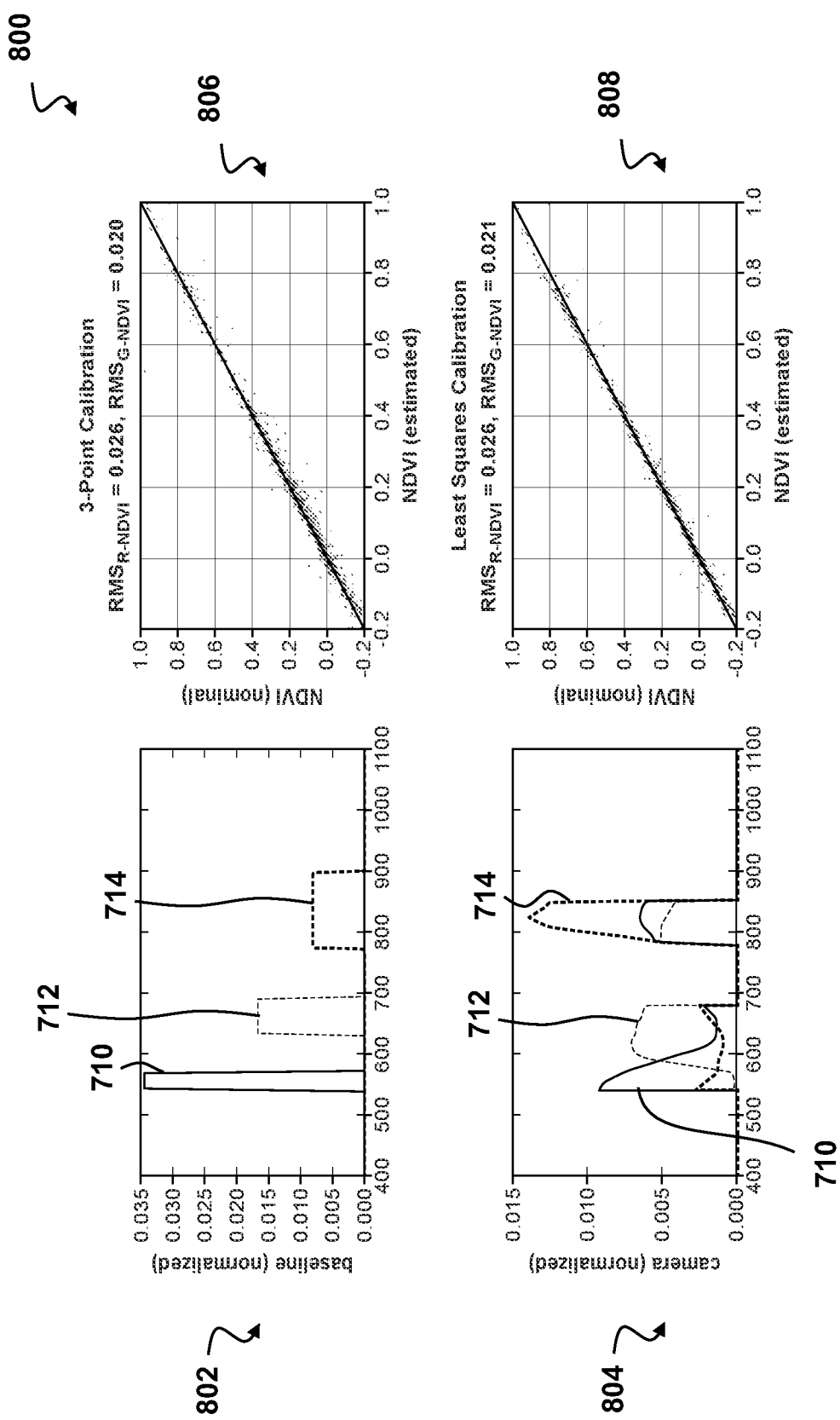
FIG. 8 depicts charts showing a performance of filters disclosed herein.

The K matrix can be computed with a minimum three color calibration or by least squared fitting various color spectra. For a three-color calibration the following illumination spectra may be used:

Green=uniform spectrum <590 nm wavelength
Red=uniform spectrum between 590 to 725 nm wavelength
IR=uniform spectrum >725 nm wavelength FIG. 8 depicts charts 800 showing a performance of filters disclosed herein. The reference filter bands are 540 nm to 570 nm, 630 nm to 692 nm and 772 nm to 898 nm. The modified camera filter bands are 540 nm to 680 nm and 780 nm to 850 nm. These wideband filters, filtering out blue and an area between red and NIR, are far more accurate than the blue block filter shown in FIG. 7. The NDVI wideband filter approach has an accuracy of about 97.4%. The GNDVI wideband filter has an accuracy of about 98%. FIG. 8 charts 800 show the wavelengths of FIG. 7 but with additional filters added to block the higher NIR wavelength and the wavelength between red and NIR. The green pixel response 710, red pixel response 712, and blue pixel response 714 are shown in the left side charts 802, 804. The spread of the plot in the right side charts 806, 808 is a lot closer to the ideal line shown on the right side charts 806, 808.

Figure 9:
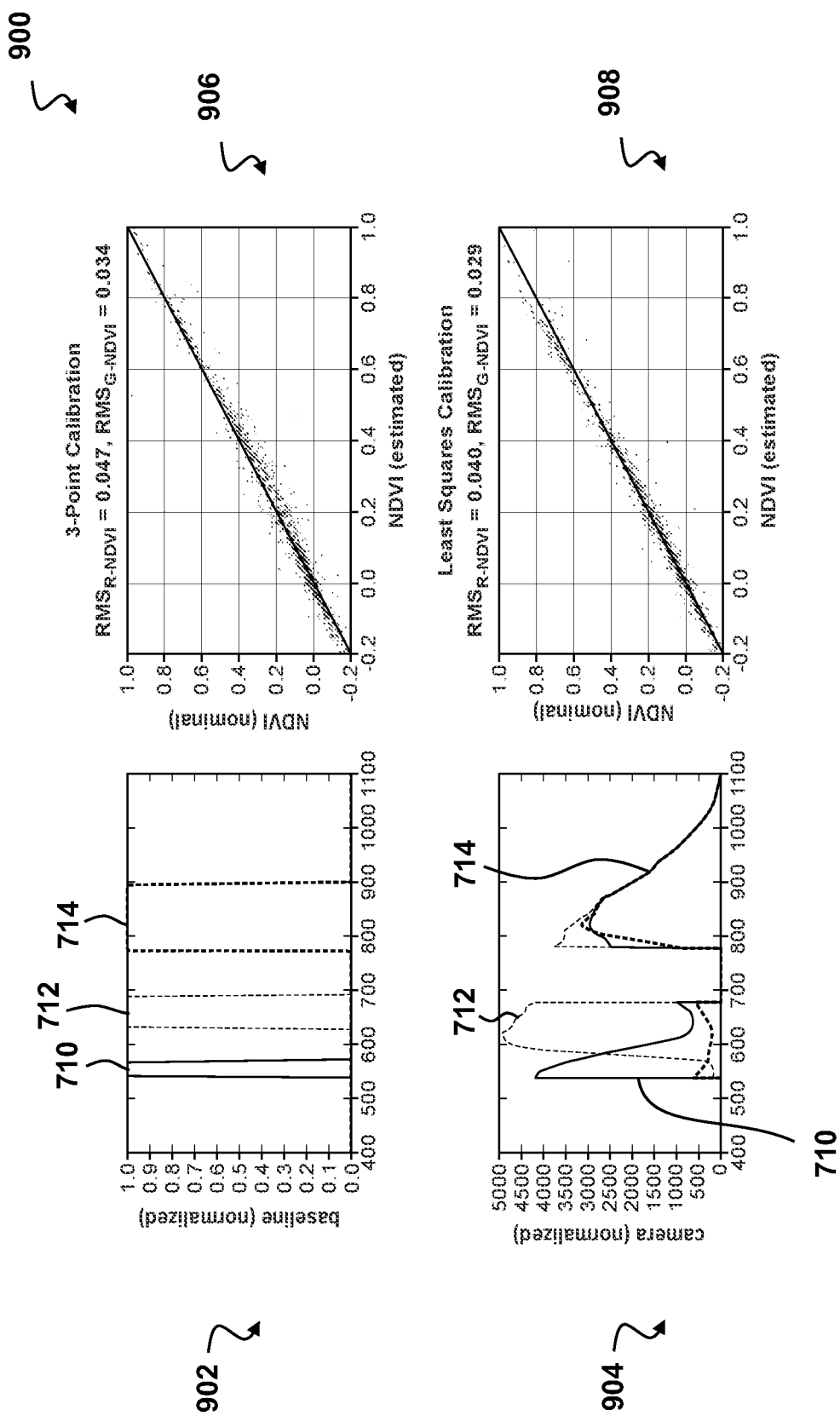
FIG. 9 depicts charts showing a performance with blue block plus red-NIR block filters.

FIG. 9 depicts charts 900 showing a performance with blue block plus red-NIR block filters. By extending the NIR band, accuracy decreases slightly over the wideband filters shown in FIG. 8. The R-NDVI wideband with extended NIR filter has an accuracy of about 95% to 96%. The G-NDVI wideband with extended NIR filter has an accuracy of about 97%. The wideband filter may provide an accuracy of 97% or greater. FIG. 9 charts 900 show the wavelengths of FIG. 8 but without a filter to block the wavelengths above about 850 nm. The embodiment shown in FIG. 9 includes the blue block filter of FIG. 8, but exclude the NIR block filter of FIG. 8. The charts of the left 902, 904 show light transmission on the vertical axis and wavelength on the horizontal axis. The wavelength between about 850-1000 nm is not filtered in the embodiment shown in FIG. 9. The green pixel response 710, red pixel response 712, and blue pixel response 714 are shown on the left side charts 902, 904. The spread of the plot in the right side charts 906, 908 is a lot close to the ideal line shown in the right side charts 906, 908, but not as close as in FIG. 8.

FIGS. 10A-10B show formulas for determining indexes and ratios based on captured data disclosed herein. The camera for the disclosed system may capture Red, Green, Blue, and NIR. Green, Red, and NIR may all be captured as NIR, NDVI, and GNDVI, respectively, on the "multispectral" camera.

The system may calculate an Atmospherically Resistant Vegetation Index (ARVI) 1000; a Difference Vegetation Index (DVI) 1002; a Enhanced Vegetation Index (EVI) 1004; a Global Environmental Monitoring Index (GEMI) 1006; a Green Atmospherically Resistant Index (GARI) 1008; a Green Difference Vegetation Index (GDVI) 1010; a Green Normalized Difference Vegetation Index (GNDVI) 1012; a Green Ratio Vegetation Index (GRVI) 1014; a Green Vegetation Index (GVI) 1016; a Infrared Percentage Vegetation Index (IPVI) 1018; a Leaf Area Index (LAI) 1020; a Visible Atmospherically Resistant Index (VARI) 1022; a WorldView Improved Vegetative Index (WV-VI) 1024; a Modified Non-Linear Index (MNLI) 1026; a Modified Simple Ratio (MSR) 1028; a Non-Linear Index (NLI) 1030; a Normalized Difference Vegetation Index (NDVI) 1032; a Optimized Soil Adjusted Vegetation Index (OSAVI) 1034; a Renormalized Difference Vegetation Index (RDVI) 1036; a Soil Adjusted Vegetation Index (SAVI) 1038; a Simple Ratio (SR) 1040; a Sum Green Index 1042; and/or a Transformed Difference Vegetation Index (TDVI) 1044. The EVI 1004 may need blue and is an input to LAI 1020. GEMI 1006, GARI 1008, and VARI 1022 may be used to compensate for atmospheric effects. GNDVI 1012 may provide cleaner results than NDVI 1032. MNLI 1026 may allow for adjustments based on soil background. RDVI 1036 may be insensitive to soil and viewing geometry. TDVI 1044 may be useful in urban areas.

Figure 11:
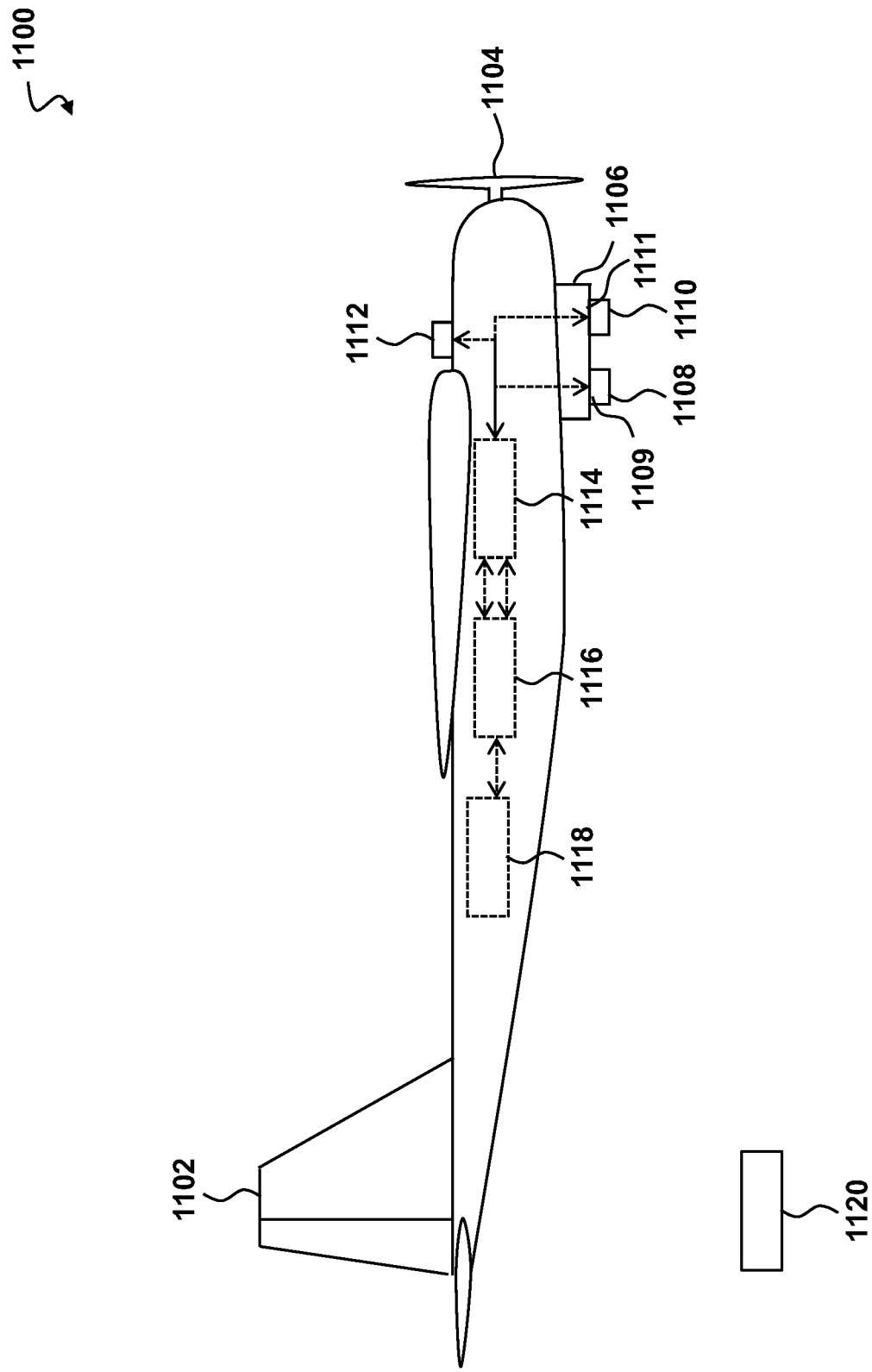
FIG. 11 depicts a system for determining vegetative indices.

FIG. 11 depicts a system 1100 for determining vegetative indices. The system 1100 may include an aerial vehicle 1102. While a standard aerial vehicle is shown, the aerial vehicle may be any aerial vehicle such as an unmanned aerial vehicle (UAV), a vertical take-off and landing (VTOL) aerial vehicle, a VTOL UAV, a quadcopter, or the like. The aerial vehicle 1102 may have one or more motors 1104, a navigation system, battery and/or fuel, and the like.

A sensor system 1106 may be attached to the aerial vehicle 1102. In some embodiments, the sensor system 1106 may be detachably attached to the aerial vehicle 1102. The sensor system 1106 may be swapped for one or more other sensor systems 1106 having a different combination of cameras and/or filters based on a desired use. The sensor system 1106 may include a first camera 1108 and a second camera 1110. The first camera 1108 may be disposed proximate the second camera 1110. The first camera 1108 and/or the second camera 1110 may be disposed on an underside of the aerial vehicle 1102 when the aerial vehicle 1102 is in horizontal flight. The first camera 1108 may have substantially the same field of view as the second camera 1110.

The first camera 1108 may include a first sensor having at least red, green, and blue color channels. The blue color channel of the first sensor may be sensitive to near-infrared (NIR) wavelengths. A first optical filter 1109 may be disposed in front of the first sensor. The first optical filter 1109 may be configured to block wavelengths below green, between red and NIR, and longer wavelength NIR. The first optical filter 1109 may be a physical filter disposed between the first sensor and a lens of the first camera 1108.

The first optical filter 1109 may include a blue block filter and/or a high block filter. The blue block filter may remove most of blue channel as we can so that the NIR response of the blue channel can provide a good surrogate for NIR. The blue block filter may also provide sufficient green. The high block filter may provide a NIR block so that a response to red, green, and blue in the NIR region are as close as possible so that more light is gathered.

The second camera 1110 may include a second sensor having at least red, green, and blue color channels. A second optical filter 1111 may be disposed in front of the second sensor. The second optical filter 1111 may be configured to block wavelengths in NIR. The second optical filter 1111 may be a physical filter disposed between the second sensor and a lens of the second camera 1110.

An incident light sensor 1112 may be attached to the aerial vehicle 1102. The incident light sensor 1112 may be disposed distal from the first camera 1108 and the second camera 1110. In one embodiment, the incident light sensor 1112 may be disposed on a top surface of the aerial vehicle 1102. The incident light sensor 1112 may create incident light data relating to the incident light provided by the sun. In some embodiments, the incident light sensor 1112 may be used to determine an exposure for each image taken by the first camera 1108 and/or the second camera 1110. The incident light sensor 1112 may also be used to determine a color of the ambient light for corrections to each image taken by the first camera 1108 and/or the second camera 1110.

The aerial vehicle may include one or more processors 1114, 1116 having addressable memory. In some embodiments, one or more processors 1116 may be utilized. The first camera 1108, second camera 1110, and incident light sensor 1112 may be in communication with the one or more processors 1114, 1116. The one or more processors 1114, 1116 may be configured to capture at least one image of vegetation from the first camera 1108. The one or more processors 1114, 1116 may be further configured to provide red, green, and NIR color channels from the captured image from the first camera 1108. The one or more processors 1114, 1116 may also be configured to capture at least one image of vegetation from the second camera 1110. The captured image from the first camera 1108 may be captured at substantially the same time as the captured image from the second camera 1110 such that both images are substantially identical except for the filters applied to each respective camera 1108, 1110. The one or more processors 1114, 1116 may be further configured to provide a blue color channel from the captured image from the second camera. The one or more processors 1114, 1116 may also capture an incident light data from the incident light sensor 1112. The incident light data from the incident light sensor 1112 may be captured at substantially the same time as the captured image from the first camera 1108 and the captured image from the second camera 1110. Capturing the images and incident light data allows the incident light data to be used to correct the captured images so that any vegetative indices are not impacted by changes in the incident light, such as during sunrise or sunset. The one or more processors 1114, 1116 may further be configured to calibrate the captured image from the first camera and/or the captured image from the second camera based on the captured incident light data. The one or more processors 1114, 1116 may then determine at least one vegetative index based on one or more of the provided red, green, blue, and NIR color channels. Not all color channels may be needed for each vegetative index. The system 1100 may also compare how each vegetative index varies over time to determine if any corrective action needs to be taken.

The system 1100 may also include one or more communication devices 1118. The one or more communication devices 1118 may include a receiver, transmitter, transceiver, or the like. The one or more communication devices 1118 may transmit captured images, incident light data, aerial vehicle 1102 location, time, and the like to a ground control station having a processor, a cloud storage having a processor, or the like. Anything performed by the one or more processors 1114, 1116 may also be performed by an external processor 1120 in communication with the aerial vehicle 1102 to determine the one or more vegetative indices.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system comprising:
a processor having addressable memory in communication with a first camera, a second camera, and an incident light sensor, wherein the processor is configured to:
receive at least one image of vegetation from the first camera;
receive at least one image of vegetation from the second camera;
receive incident light data from the incident light sensor;
provide red, green, and near-infrared (NIR) color channels from the received image from the first camera;
determine at least one vegetative index based on the provided red, green, and NIR color channels; and
calibrate the received image of vegetation from the first camera and the received image of vegetation from the second camera after the received images are received based on the received incident light data and the determined at least one vegetative index.

2. The system of claim 1, further comprising:
a first sensor of the first camera; and
a second sensor of the second camera;
wherein the incident light sensor is disposed distal from the first camera and the second camera.

3. The system of claim 2, wherein the first sensor of the first camera comprises at least red, green, and blue color channels, wherein the blue color channel is sensitive to NIR wavelengths.

4. The system of claim 3, further comprising:
a first optical filter disposed in front of the first sensor.

5. The system of claim 4, wherein the first optical filter is configured to block wavelengths below green, between red and NIR, and longer wavelength NIR.

6. The system of claim 5, wherein the second sensor of the second camera comprises at least red, green, and blue color channels.

7. The system of claim 1, wherein the determined at least one vegetative index comprises a normalized difference vegetation index (NDVI).

8. The system of claim 1, wherein the determined at least one vegetative index comprises a green normalized difference vegetation index (GNDVI).

9. The system of claim 1, further comprising an aerial vehicle comprising: the first sensor, the second sensor, and the incident light sensor, wherein the aerial vehicle is at least one of: a vertical take-off and landing (VTOL) aerial vehicle, a VTOL unmanned aerial vehicle (UAV), and a UAV.

10. The system of claim 4, wherein the first optical filter is configured to block wavelengths under about 540 nm.

11. The system of claim 4, wherein the first optical filter is configured to block wavelengths between about 680 nm and 780 nm.

12. The system of claim 4, wherein the first optical filter is configured to block wavelengths above around 900 nm.

13. The system of claim 4, wherein the first optical filter is configured to allow wavelengths between about 540 nm and 680 nm and between about 780 nm and 850 nm.

14. The system of claim 1, wherein the received at least one image is at least one of: a high-resolution image and comprises wavelengths in green, red, and NIR.

15. The system of claim 2, wherein the first sensor comprises a Bayer filter on the first sensor.

16. The system of claim 2, further comprising:
a second optical filter disposed in front of the second sensor, wherein the second optical filter is configured to block wavelengths in NIR.

17. The system of claim 1, wherein the processor is further configured to:
receive at least one image of vegetation from the second camera, wherein a field of view of the first camera is substantially the same as a field of view of the second camera, wherein the first camera is disposed proximate the second camera, and wherein the received image from the first camera is captured at substantially the same time as the received image from the second camera;
provide a blue color channel from the received image from the second camera; and
determine at least one vegetative index based on the provided red, green, blue, and NIR color channels.

18. A method comprising:
receiving, by a processor having addressable memory in communication with a first camera, a second camera, and an incident light sensor, at least one image of vegetation from the first camera, at least one image of vegetation from the second camera, and incident light data from the incident light sensor;
providing, by the processor, red, green, and near-infrared (NIR) color channels from the received image from the first camera;
determining, by the processor, at least one vegetative index based on the provided red, green, and NIR color channels; and
calibrate, by the processor, the received image of vegetation from the first camera and the received image of vegetation from the second camera after the received images are received based on the received incident light data and the determined at least one vegetative index.

19. The method of claim 18, wherein the determined at least one vegetative index comprises at least one of: a normalized difference vegetation index (NDVI) and a green normalized difference vegetation index (GNDVI).

20. The method of claim 19, wherein determining the NDVI further comprises:
subtracting, by the processor, spectral reflectance measurements in the red region of the received at least one image from spectral reflectance measurements in the NIR region;
adding, by the processor, spectral reflectance measurements in the red region of the received at least one image to spectral reflectance measurements in the NIR region; and
dividing, by the processor, the subtracted measurements from the added measurements.

* * * * *